Dec. 7, 1937.    L. T. SACHTLEBEN    2,101,458
TRIMMING DEVICE
Filed Sept. 28, 1935
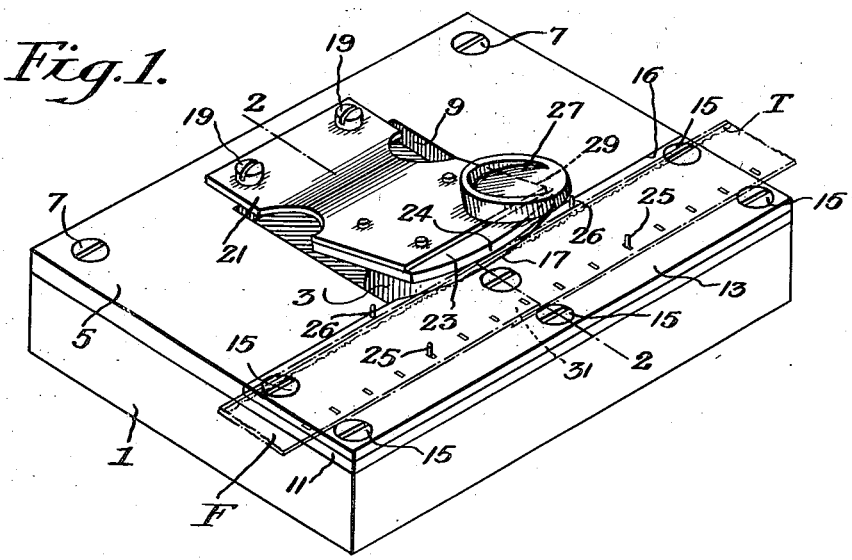
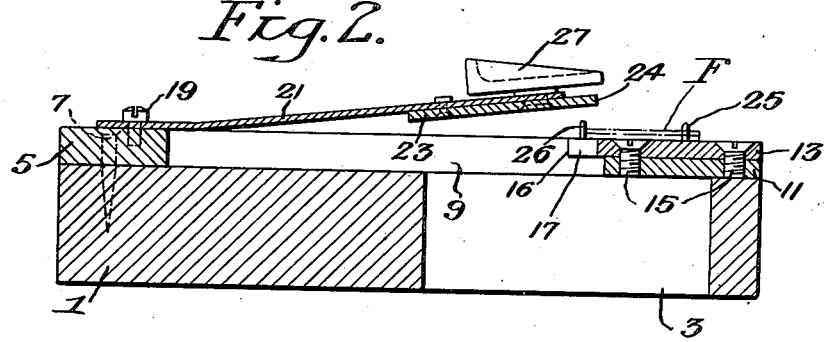
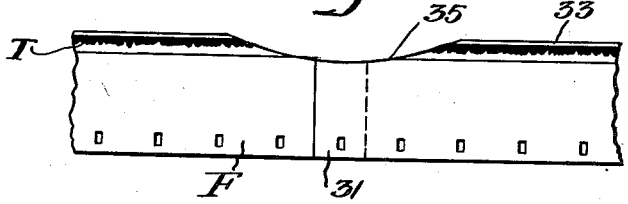
Inventor
Lawrence T. Sachtleben
by S R Goldsborough
Attorney.
Witnesses:

Patented Dec. 7, 1937

2,101,458

UNITED STATES PATENT OFFICE 2,101,458

TRIMMING DEVICE

Lawrence T. Sachtleben, Camden, N. J., assignor to Radio Corporation of America, a corporation of Delaware Application September 28, 1935, Serial No. 42,629

6 Claims. (Cl. 164—50)

This invention relates to trimming devices, and more particularly to a device for trimming photographic sound records.

Celluloid film upon which action and sound are recorded to form so called "talking-movie" films are subject to considerable marring during handling, as by scratches, accumulation of foreign matter, etc., and also to occasional tearing, the latter requiring splicing together of the film parts. It is well known that blemishes on the sound record produce undesirable noises during reproduction, and various proposals have been made to eliminate the effect of blemishes, particularly in the case of spliced film. For example, it has been proposed to blacken in those parts of the sound track where the splices occur, so that no light will be transmitted by the record at such points. It has also been proposed to interpose a shutter into the path of the reproducing light beam as the splices traverse the beam. These proposals are subject to the disadvantages that the film must be specially processed or that accurately controlled apparatus be provided to effect the desired result.

The primary object of my invention is to provide an improved method of and means for removing blemishes from photographic sound records and thereby to provide photographic sound records which will be free from the foregoing objections.

More specifically, it is an object of my invention to provide an improved trimmer for removing blemished portions of the film.

Another object of my invention is to provide an improved film trimmer which will so condition spliced or otherwise blemished photographic sound records that they will not produce undesirable noises during reproduction.

A further object of my invention is to provide an improved film trimmer as aforesaid which will remove undesirable portions from the film cleanly and sharply.

It is also an object of my invention to provide an improved film trimmer of the type set forth which is simple in construction, which will not get out of order, which is highly efficient in operation, and which is inexpensive in cost.

In accordance with my invention, I provide a hand operated shearing device in which the blade is operated by pressure applied at one end thereof. Suitable film locating devices serve to properly locate the film with respect to the blade so that, when depressed, the blade will shear off the undesired portion of the sound track. The blade is so shaped that the portion of the film it cuts away will have a curvature of such form and dimensions as not to excite the lowest frequency to which the reproducer employing the film responds when the film passes the scanning light or any frequency above it. Where a splice in the sound track is to be removed, it is essential that the entire splice at the track be trimmed away so that none of the splice will be scanned.

The novel features that I consider characteristic of my invention are set forth with particularity in the appended claims. However, the invention itself, together with additional objects and advantages thereof, will best be understood from the following description of one embodiment thereof when read in connection with the accompanying drawing, in which Figure 1 is a perspective view of my improved trimmer, Figure 2 is a sectional view thereof taken on the line 2—2 of Figure 1, and Figure 3 is a plan view of a film record as it appears after being trimmed by my improved trimmer.

Referring more specifically to the drawing, wherein like reference characters designate corresponding parts throughout, there is shown a block 1 provided with an opening 3 and having a metallic base plate 5 secured thereto, as by the screws 7 or the like. The plate 5 has its central portion cut out to provide an opening 9 which communicates with the opening 3 and its forward portion reduced in thickness to provide a stepped portion 11 over which a hardened steel strip 13 is fitted, the strip 13 being secured to the portion 11 by the screws 15 and having its inner edge 16 cut away over the opening 9 along an arc 17 to constitute a fixed blade or cutting edge.

Secured to the plate 5 by means of screws 19 is an upwardly directed spring blade 21 which has secured thereto at its forward edge a hardened steel cutting blade 23 the cutting edge 24 of which has the same contour as and is adapted to accurately fit the cutting edge 17 to cooperate therewith to trim a film F. A plurality of pins 25 and 26 upstanding from the strip 13 serve to so locate the film F with respect to the cutting edges 17 and 24 that the sound track T thereon will overlie the cut-away 17 a distance sufficient to enable the blade 23 to remove the track T slightly beyond the limit of the area thereof covered by the scanning light. A thumb piece 27 is fixed to the spring blade adjacent one end of the cutting edge 24, as at 29, and when the blade 21 is depressed upon application of a force to the thumb piece, the corner 29 will be first to reach the strip 13 and the rest of the cutting blade 23 will gradually follow, whereby a shearing action takes place and the film is cut cleanly and sharply. The spring blade constantly tends to hold the blade 23 out of shearing relation with the blade 17 and returns the blade 23 to raised position when pressure is removed from the thumb piece 27.

Assume, now, that the film to be trimmed has a splice 31 in it which produces an undesirable noise during reproduction commonly referred to as a "bloop". To eliminate this, the film F is threaded upon the pins 25 in a position such that the splice 31 is substantially midway between the extremities of the cutaway 17 with the sound track edge 33 of the film lying against the pins 26. The blade 23 is then depressed by applying pressure to the thumb piece 27 and a section of the sound track including the splice 31 is sheared off to provide a segmental notch 35, the waste passing through the opening 3. As will be noted, the notch 35 is widest at the splice 31, covering a width somewhat greater than that of the track T at this point, and gradually approaches the edge 33 on each side of the splice. The length of the notch 35 should be such that the time it takes for the notch to pass the scanning light is longer than the period of lowest frequency of the reproducing system. When this condition prevails, the sound will gradually fade out and fade in again as the notch 35 passes the scanning light without any unpleasant disturbance in the sound.

From the foregoing description, it will be apparent that I have provided a simple and efficient trimmer for quickly and easily removing blemishes from photographic sound tracks which give rise to undesirable noises during reproduction. My improved trimmer not only eliminates the necessity for further processing of the film and for employing additional apparatus, such as light shutters with which, incidentally, notched films must also be provided (as, for example, in the system disclosed in the DeForest Patent No. 1,894,024), but, by entirely removing the cause of the "bloop", provides an improved record capable of satisfactory reproduction in any conventional photographic sound reproducing system.

Although I have shown and described but one specific embodiment of my invention, I am fully aware that many modifications thereof are possible. I desire, therefore, that no limitations shall be imposed on my invention other than those necessitated by the prior art and by the spirit of the appended claims.

I claim as my invention:

1. A trimming device for photographic strip sound records comprising a base, a blade fixedly mounted on said base and having an arcuate cutting edge, a blade movably mounted on said base for cooperation with said fixed blade, said movable blade having an arcuate cutting edge adapted to accurately fit said first named cutting edge, means on said fixed blade for locating a strip relative to said cutting edges and in the path of movement of said movable blade, and means associated with said movable blade whereby a force may be applied thereto for moving said movable blade into shearing relation with said fixed blade to shear an arcuate notch in said strip.

2. A trimming device for photographic strip sound records comprising a base, a blade fixedly mounted on said base and having an arcuate cutting edge, a blade movably mounted on said base for cooperation with said fixed blade, said movable blade having an arcuate cutting edge adapted to accurately fit said first named cutting edge, means on said fixed blade for locating a strip relative to said cutting edges and in the path of movement of said movable blade, and a thumb piece on said movable blade adjacent one end thereof whereby, when said movable blade is depressed by applying pressure to said thumb piece, said movable blade is brought into shearing relation with said fixed blade to shear an arcuate notch in said strip.

3. The invention set forth in claim 2 characterized by the addition of a spring blade which is fixedly mounted on said base, and characterized further in that said movable blade is fixed to said spring blade in cooperative relation to said fixed blade, said spring blade tending constantly to maintain said movable blade out of shearing relation with said fixed blade.

4. The invention set forth in claim 2 characterized in that the strip locating means is so arranged as to locate the strip with its sound track overlying the arcuate cutting edge of said fixed blade a distance sufficient to enable said movable blade to remove said track slightly beyond the limit of the area thereof covered by the scanning light beam of reproducing apparatus adapted to reproduce sound from said record.

5. The invention set forth in claim 2 characterized in that the strip locating means is so arranged as to locate the strip with its sound track overlying the arcuate cutting edge of said fixed blade a distance sufficient to enable said movable blade to remove said track slightly beyond the limit of the area thereof covered by the scanning light beam of reproducing apparatus adapted to reproduce sound from said record and with a blemish on the film substantially midway between the extremities of said arcuate cutting edge.

6. The invention set forth in claim 2 characterized in that the strip locating means is so arranged as to locate the strip with its sound track overlying the arcuate cutting edge of said fixed blade a distance sufficient to enable said movable blade to remove said track slightly beyond the limit of the area thereof covered by the scanning light beam of reproducing apparatus adapted to reproduce sound from said record, and the length of the notch formed in said strip being such that the time interval for passing said notch past said scanning beam is longer than the period of the lowest frequency that may be reproduced by said reproducing apparatus.

LAWRENCE T. SACHTLEBEN.